Sept. 23, 1958 E. J. MURPHY 2,853,683

HYBRID JUNCTION

Filed April 30, 1953

INVENTOR
EDWARD J. MURPHY
BY
Thomas M. Ferrill, Jr.
ATTORNEY

United States Patent Office 2,853,683

Patented Sept. 23, 1958

2,853,683

HYBRID JUNCTION

Edward J. Murphy, Los Altos, Calif., assignor to Sperry Rand Corporation, a corporation of Delaware Application April 30, 1953, Serial No. 352,141

14 Claims. (Cl. 333—11)

This invention relates to microwave transmission apparatus, and more particularly, is concerned with a folded type of hybrid junction. This invention is related to the copending application Serial No. 352,244 filed April 30, 1953 in the name of P. Gene Smith and assigned to the same assignee. This application issued as Patent 2,792,551 on May 14, 1957.

As is well known to those skilled in the art, the hybrid junction or so-called "magic tee" type of junction includes four wave guide arms which intersect in such a manner that two of the arms are collinear extensions of each other, and the other two branch arms are at right angles to each other and to the collinear arms. See Patent No. 2,445,895. This structure has balanced characteristics like those of a hybrid coil and is used for analagous purposes at the relatively high frequencies where wave guides find their principal applications.

As a result of the peculiar configuration of the hybrid junction in which the branch arms are mutually perpendicular with each other and with the collinear arms, the use of the magic tee type junction frequently results in a ponderous and unhandy microwave transmission line layout. While such space-consuming wave guide circuits may be tolerable in laboratory equipment, for example, use of the magic tee for this reason has proved troublesome in airborne radar systems where compactness is essential.

It is the general object of this invention to avoid and overcome the foregoing and other difficulties of and objections to the prior art practices by the provision of an improved wave guide hybrid junction.

Another object of this invention is to provide a hybrid junction in which the collinear arms are folded so as to be parallel to each other and substantially aligned with one of the branch arms whereby a much more compact physical design is achieved.

These and other objects of the invention which will become apparent as the description proceeds are achieved by providing a hybrid junction in which the usual collinear arms are in effect folded back so as to be positioned in parallel relationship to each other with a common broad wall in the form of a septum separating the two arms. These wave guide arms merge through a tapered section into a first rectangular branch arm. The second branch arm of the hybrid junction is joined at one end to the adjacent narrow walls of the collinear arms in the region of the tapered section, the septum forming the collinear arms extending partially into the second branch arm.

For a better understanding of the invention reference should be had to the accompanying drawing wherein.

Figures 1, 2, 3, 4, 5:
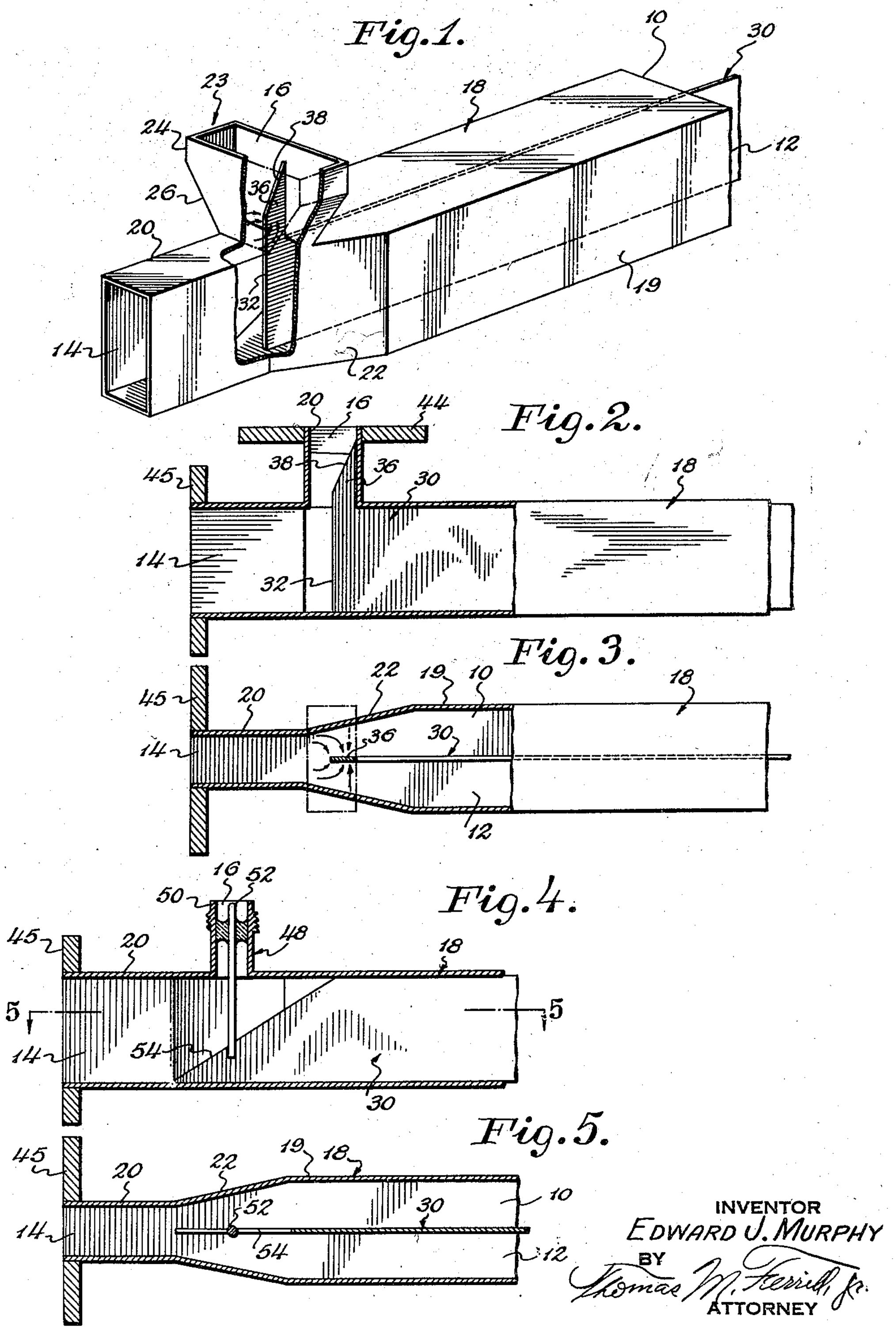
Fig. 1 is a perspective view that is partially cut away to show internal details of a hybrid junction without the coupling flanges or attached wave guide lines.
Fig. 2 is a sectional view of the junction shown in Fig. 1 and showing coupling flanges on the branch arms.
Fig. 3 is a plan view, partially in section, of the hybrid junction of Fig. 2.
Fig. 4 is a sectional view of a modified form of junction in which one arm is a coaxial line.
Fig. 5 is a sectional view taken on the line 5—5 of Fig. 4.

With specific reference to the forms of the invention as illustrated in the drawing, the numerals 10 and 12 indicate generally the two arms of the folded hybrid junction which correspond in function to the usual collinear arms of the standard form of magic tee. The numeral 14 indicates generally one of the branch arms of the folded hybrid junction which corresponds in function to the series arm of the standard magic tee while the numeral 16 indicates generally the other branch arm of the present hybrid junction which corresponds in function to the shunt arm of the standard magic tee. The arms 10, 12, 14, and 16 will hereinafter be referred to in terms of their equivalent functions in the conventional type of magic tee structure.

In accordance with the embodiment of the invention illustrated in Figs. 1 through 3, the numeral 18 indicates generally a section of hollow pipe having a section 19 which is substantially square in cross section. At one end thereof, the hollow pipe 18 is reduced in one cross-sectional dimension to form a rectangular section 20, the tapered section of the pipe 18 joining the square and rectangular sections being indicated at 22. A second hollow pipe, indicated generally at 23, includes a rectangular wave guide 24 that is joined at one end to the top wall of the first pipe 18 by means of a tapered transition section 26, the first pipe 18 and second pipe 23 extending at right angles to each other. The second pipe is joined to the first pipe in the region of the tapered transition section 22.

A septum, indicated generally at 30, extends between the top and bottom walls of the first pipe 18 in the square section 19 dividing it into two adjacent rectangular wave guides which form the two collinear arms 10 and 12 of the hybrid junction. The septum 30 extends into the region of the junction and terminates in an edge 32 which lies substantially along the longitudinal axis of the second pipe 23. A portion 36 of the septum 30 extends up into the shunt arm 16 along the edge 32 and terminates in a tapered edge 38 which provides a gradual transition for energy coupled from the second pipe 23 into the first pipe 18, thereby reducing reflection of energy back along the shunt arm 16. A flange 44 may be provided for coupling a wave guide transmission line to the shunt arm 16 of the hybrid junction. Likewise, a flange 45 may be provided for coupling a wave guide transmission line to the series arm 14 of the hybrid junction.

To function as a magic tee, the junction must provide complete isolation between the branch arms 14 and 16, that is, no energy must be coupled directly from one branch arm into the other. Likewise, there must be isolation between the collinear arms 10 and 12. To accomplish this result, the branch arms 14 and 16 must each be matched to the collinear arms 10 and 12 and the symmetry of the junction about the plane of the septum 30 must be maintained.

The match between the series arm 14 and the collinear arms 10 and 12 is provided by the tapered section 22, the section 22 providing a gradual transition between the rectangular section 20 forming the series arm 14, and the collinear arms 10 and 12. Since the electric field of the dominant mode in the rectangular section 20 is perpendicular to the septum 30, the latter causes negligible reflection at the edge 32. Any mismatch caused by the opening at the junction with the second pipe 23 can be minimized by proper tapering of the walls of the section 22 and by proper positioning of the junction along the tapered section 22.

The portion 36 of the septum 30 extending up into the second pipe 23 effects coupling of energy transmitted therein in the dominant mode into the collinear arms 10 and 12 by distorting the field configuration along the tapered edge 38 in the manner indicated by the arrows in Figs. 1 and 3. It will be seen that the distorted field has components perpendicular to the face of the septum 30 which couple energy in the dominant mode into the arms 10 and 12 as indicated by the dotted arrows of Fig. 3. Due to the symmetry of the field produced, these perpendicular components oppose each other in the branch arm 14, so that no energy from the arm 16 is propagated back along the series arm 14. Energy in the shunt arm 16 having electric field components parallel to the septum 30 tends to be propagated transversely across the first pipe 18 along the edge 32 of the septum, but the series arm 14 and collinear arms 10 and 12 of the hybrid junction are below cut-off for the mode which can be set up by these components, so that no energy is coupled between the series and shunt arms.

Referring to the form of the invention illustrated in Figs. 4 and 5, a modified form of the folded hybrid junction above described is shown in which the shunt arm 16 is provided by a coaxial transmission line indicated at 48. The outer conductor 50 of the coaxial line 48 is joined at one end to the wall of the tapered section 22; the inner conductor 52 of the coaxial line 48 extends into the interior of the hollow pipe 18. In the modified form, the septum 30 terminates in an edge 54 which extends between the top and bottom walls of the pipe 18 at an acute angle therewith. The inner conductor 52 of the coaxial line 50 terminates along the tapered edge 54 of the septum 30, the position of the edge 54 along the hollow pipe 18 being such that the conductor 52 extends substantially across the hollow pipe 18, as is apparent from the drawing.

Although the shunt arm 16 in the modified form of Figs. 4 and 5 is coaxial, the operation is substantially the same as the hollow wave guide form of Figs. 1–3.

Energy in the series arm 14 is divided between the two collinear arms 10 and 12 by the septum 30, the energy in the two collinear arms being in phase. Energy in the coaxial line of the shunt arm has components of the electric field which are perpendicular to the septum 30 and thereby couple energy into each of the two collinear arms, the energy being in phase opposition in the two collinear arms. This phase opposition results in cancellation of energy coupled back into the series arm 14. Components of the electric field of energy in the coaxial line 48 which are parallel to the septum 30 can only set up a mode of propagation in the pipe 18 for which the rectangular section 20 is below cut-off. Thus, substantially complete isolation between the coaxial shunt arm 16 and the series arm 14 is effected.

From the above description it will be recognized that the various objects of the invention have been achieved by the provision of a hybrid junction which is much more compact than the conventional magic tee and yet gives equivalent performance. Actually the junction can be used in a space no wider than the width dimensions necessary for a wave guide transmission line.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A folded hybrid junction comprising a first hollow pipe having a rectangular section, a square section, and a tapered section joining the square and rectangular sections, the first pipe sections being aligned along a common longitudinal axis, a second hollow rectangular pipe joined to the first pipe in the region of the tapered section thereof, the longitudinal axes of the first and second pipes intersecting at right angles, and a septum lying in the plane defined by the intersecting axes and extending the entire distance between opposite walls of the square section of the first pipe for dividing the square section into two parallel wave guides, the septum terminating in the tapered section of the first pipe in an edge extending parallel to the longitudinal axis of the second pipe, a portion of the septum extending into the second pipe along the wall of the second pipe nearest the square section of first pipe and having an edge spaced from the opposite wall of the second pipe, said last-named edge being an extension of said terminating edge of the septum, said portion being tapered at the end thereof projecting farthest into the second pipe.

2. A folded hybrid junction comprising a first hollow pipe having a rectangular section, a square section, and a tapered section joining the square and rectangular sections, the first pipe sections being aligned along a common longitudinal axis, a second hollow rectangular pipe joined to the first pipe in the region of the tapered section thereof, the longitudinal axes of the first and second pipes intersecting at right angles, and a septum lying in the plane defined by the intersecting axes and extending the entire distance between opposite walls of the square section of the first pipe for dividing the square section into two parallel wave guides, the septum extending partially into the tapered section of the first pipe and extending partially into the second pipe, the septum terminating in an edge extending substantially along the longitudinal axis of the second pipe from the wall of the first pipe opposite the junction with the second pipe to a point within the second pipe, the edge of the septum tapering off from said point to the adjoining wall of the second pipe.

3. A folded hybrid junction comprising a first hollow pipe having a rectangular section, a square section, and a tapered section joining the square and rectangular sections, the first pipe sections being aligned along a common longitudinal axis, a second hollow rectangular pipe joined to the first pipe in the region of the tapered section thereof, the longitudinal axes of the first and second pipes intersecting at right angles, and a septum lying in the plane defined by the intersecting axes and extending the entire distance between opposite walls of the square section of the first pipe for dividing the square section into two parallel wave guides, the septum terminating in the tapered section of the first pipe in an edge extending parallel to the longitudinal axis of the second pipe, a portion of the septum extending into the second pipe along the wall of the second pipe nearest the square section of first pipe and having an edge spaced from the opposite wall of the second pipe, said last-named edge being an extension of said terminating edge of the septum.

4. A folded hybrid junction comprising a first hollow pipe having a rectangular section, a square section, and a tapered section joining the square and rectangular sections, the first pipe sections being aligned along a common longitudinal axis, a second hollow rectangular pipe joined to the first pipe in the region of the tapered section thereof, the longitudinal axes of the first and second pipes intersecting at right angles, and a septum lying in the plane defined by the intersecting axes and extending the entire distance between opposite walls of the square section of the first pipe for dividing the square section into two parallel wave guides, the septum terminating in the tapered section of the first pipe in an edge extending parallel to the longitudinal axis of the second pipe, a portion of the septum extending into the second pipe along the wall of the second pipe nearest the square section of first pipe and having an edge spaced from the opposite wall of the second pipe.

5. A folded hybrid junction comprising a first hollow pipe having a rectangular section, a square section, and a tapered section joining the square and rectangular sections, the first pipe sections being aligned along a common longitudinal axis, a second hollow rectangular pipe joined to the first pipe in the region of the tapered section thereof, the longitudinal axes of the first and second pipes intersecting at right angles, and a septum lying in the plane defined by the intersecting axes and extending the entire distance between opposite walls of the square section of the first pipe for dividing the square section into two parallel wave guides, the septum terminating in the tapered section of the first pipe with a portion of the septum extending into the second pipe along the wall of the second pipe nearest the square section of first pipe and having an edge spaced from the opposite wall of the second pipe.

6. A folded hybrid junction comprising a first hollow pipe having a rectangular section, a square section, and a tapered section joining the square and rectangular sections, the first pipe sections being aligned along a common longitudinal axis, a second hollow rectangular pipe joined to the first pipe in the region of the tapered section thereof, the longitudinal axes of the first and second pipes intersecting at right angles, and a septum lying in the plane defined by the intersecting axes and extending the entire distance between opposite walls of the square section of the first pipe for dividing the square section into two parallel wave guides, the septum terminating in the tapered section of the first pipe with a portion of the septum extending into the second pipe.

7. A folded hybrid junction comprising a first hollow pipe, a second hollow pipe joined at one end to one wall of the first pipe to form a T-junction, the longitudinal axes of the first and second pipes intersecting each other, and a septum lying in the plane defined by the intersecting axes and being positioned in the first pipe substantially to one side of the junction with the second pipe, the septum terminating in an edge lying substantially along the longitudinal axis of the second pipe, a portion of the septum extending into the second pipe.

8. A hybrid junction comprising parallel rectangular sections of wave guide having a thin common broad wall therebetween, a rectangular wave guide section substantially aligned with said parallel sections, the broad walls of the rectangular section lying in planes parallel to said common wall, a tapered wave guide section joining said parallel sections to said rectangular section at their respective ends, said common broad wall extending partially into the tapered wave guide section, and a branch wave guide coupled at one end into the tapered wave guide section through a wall in the tapered section that is perpendicular to said common wall.

9. A hybrid junction as set forth in claim 8 wherein the branch wave guide is a coaxial line.

10. A hybrid junction as set forth in claim 9 wherein said common wall terminates in an edge extending at an acute angle between opposite walls of the tapered wave guide section, the inner conductor of the coaxial branch wave guide extending into the tapered wave guide section and terminating at said edge of the common wall.

11. A hybrid junction comprising parallel rectangular sections of wave guide having a thin common wall therebetween, a rectangular wave guide section substantially aligned with said parallel sections, the two opposite walls of said rectangular wave guide section corresponding to said common wall lying in planes parallel to said common wall, a tapered wave guide section joining said parallel sections to said rectangular section at their respective ends, said common wall extending partially into the tapered wave guide section, and a branch wave guide coupled at one end into the tapered wave guide section through a wall in the tapered section that is perpendicular to said common wall.

12. A hybrid junction comprising parallel rectangular sections of wave guide having a thin septum serving as a common broad wall therebetween, a rectangular wave guide section substantially aligned with said parallel sections, the broad walls of the rectangular section lying in planes parallel to said common wall, a tapered wave guide section joining said parallel sections to said rectangular section at their respective ends, and a branch wave guide coupled at one end into the tapered wave guide section through a wall in the tapered section that is perpendicular to said common broad wall, said common broad wall extending into the tapered wave guide section and terminating at least partially within the projected area of said branch wave guide and being in physical and electrical contact with a portion of the branch wave guide.

13. A hybrid junction as set forth in claim 12 wherein the branch wave guide is a coaxial line.

14. A hybrid junction as set forth in claim 13 wherein said common wall terminates in an edge extending at an acute angle between opposite walls of the tapered wave guide section, the inner conductor of the coaxial branch wave guide extending into the tapered wave guide section and terminating one said edge of the common wall.

References Cited in the file of this patent

UNITED STATES PATENTS

| | | |
|---|---|---|
| 2,445,895 | Tyrrell | July 27, 1948 |
| 2,575,804 | Friis | Nov. 20, 1951 |
| 2,584,162 | Sensiper | Feb. 5, 1952 |
| 2,593,120 | Dicke | Apr. 15, 1952 |
| 2,643,295 | Lippmann | June 23, 1953 |
| 2,691,731 | Miller | Oct. 12, 1954 |
| 2,764,740 | Pratt | Sept. 25, 1956 |